(12) United States Patent  (10) Patent No.: US 8,579,341 B2
Greer  (45) Date of Patent: Nov. 12, 2013

(54) GRILL GRATE LIFTER

(76) Inventor: James K. Greer, Kansas City, MO (US)

( * ) Notice: Subject to any disclaimer, the term of this patent is extended or adjusted under 35 U.S.C. 154(b) by 0 days.

(21) Appl. No.: 13/590,508

(22) Filed: Aug. 21, 2012

(65) Prior Publication Data

US 2013/0055506 A1 Mar. 7, 2013

Related U.S. Application Data

(60) Provisional application No. 61/530,669, filed on Sep. 2, 2011.

(51) Int. Cl.
*A47J 45/10* (2006.01)
(52) U.S. Cl.
USPC ............................ 294/9; 294/27.1; 294/131
(58) Field of Classification Search
USPC ............ 294/9, 12, 15, 26, 173, 27.1, 32, 131, 294/145, 170
See application file for complete search history.

(56) References Cited

U.S. PATENT DOCUMENTS

| | | | |
|---|---|---|---|
| 358,803 A | 3/1887 | Chestnut | |
| 506,173 A * | 10/1893 | Gmelin | 294/2 |
| 1,137,909 A * | 5/1915 | Rusfeldt | 294/33 |
| 1,161,657 A * | 11/1915 | Graves et al. | 294/33 |
| 1,369,965 A * | 3/1921 | Comstock | 294/27.1 |
| 2,025,160 A * | 12/1935 | Everett | 294/16 |
| 2,790,585 A * | 4/1957 | Smith | 294/158 |
| 3,251,622 A * | 5/1966 | Miller | 294/33 |
| 3,262,727 A * | 7/1966 | Blackaby | 294/170 |
| D246,886 S | 1/1978 | Malafouris | |
| 4,471,985 A | 9/1984 | Mahoney | |
| 4,482,181 A | 11/1984 | Shepherd | |
| D312,375 S | 11/1990 | Hessler | |
| 5,071,182 A | 12/1991 | Mair | |
| D341,065 S | 11/1993 | Martner | |
| 5,346,268 A | 9/1994 | Baker et al. | |
| D358,073 S | 5/1995 | Eckert | |
| D468,976 S | 1/2003 | Mitchell | |
| 6,752,441 B1 | 6/2004 | Morris | |
| 7,108,304 B2 | 9/2006 | White | |
| 7,213,851 B2 * | 5/2007 | Mann | 294/26 |
| D604,122 S | 11/2009 | Borovicka et al. | |

* cited by examiner

*Primary Examiner* — Dean Kramer
(74) *Attorney, Agent, or Firm* — Erickson Kernell Derusseau & Kleypas, LLC

(57) ABSTRACT

A grill grate lifting tool that engages the grill at three or more points. The grill lifter hooks between the tines of the grill grate at the rim and/or to a handle of the grill grate. The grill grate lifting tool includes a handle attached to three or more legs, which is generally central above the center of mass of the grill grate to provide a stable lifting point with or without food on the grate.

11 Claims, 4 Drawing Sheets

GRILL GRATE LIFTER

CROSS-REFERENCE TO RELATED APPLICATIONS

This application claims the benefit of co-pending application Ser. No. 61/530,669, filed on Sep. 2, 2011, entitled GRILL GRATE LIFTER.

FIELD OF THE INVENTION

The present invention relates to a lifter to manipulate a grill grate used on barbeques and the like and, more particularly, to a lifter for engaging a hot grill grate to lift and manipulate the grill grate with or without meat or other foods being grilled on the grill grate.

BACKGROUND

Grill grate lifting devices are generally known in the art. Barbeque grills are designed for cooking meat or other foods over hot charcoal or other heat sources. The food is placed on the grill grate, which supports the food over the heat source. Often times, especially with charcoal grills and especially when smoking the meat or food placed on the grill grate, additional charcoal needs to be added. In order to add the charcoal, the grill grate must be removed. Manipulating the hot grill grate without dropping the food off the grill grate can be difficult.

Various grill grate lifting devices have been proposed to remove a hot grill grate. Typically, these devices include a handle with a long shaft with a hook at the end of the shaft opposite the handle. The hook can be passed under the tines of the grill grate to securely hold the grate. The shaft acts as a lever arm to aid in lifting the grate from the grill. Because the hook engages the grate generally at a single location, the grill grate is unstable when being lifted from the grill. Further, if there is food on the grill grate, the user might balance the food and grate as it is being lifted from the grill grate. The problem is further exacerbated by the lever arm of the shaft, increasing the load experienced by the user at the same time making it difficult to control and balance.

SUMMARY

The present invention provides a grill grate lifting tool that engages the grill at three or more points. The grill lifter hooks between the tines of the grill grate and/or to a handle of the grill grate. The grill grate lifting tool includes a handle attached to three or more legs, which is generally central above the grill grate to provide a stable lifting point with or without food on the grate.

DETAILED DESCRIPTION

As required, detailed embodiments of the present invention are disclosed herein. However, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

Moreover, except where otherwise expressly indicated, all numerical quantities in this description and in the claims are to be understood as modified by the word "about" in describing the broader scope of this invention. Practice within the numerical limits stated is generally preferred. Also, unless expressly stated to the contrary, the description of a group or class of materials as suitable or preferred for a given purpose in connection with the invention implies that mixtures or combinations of any two or more members of the group or class may be equally suitable or preferred.

Figure 1:
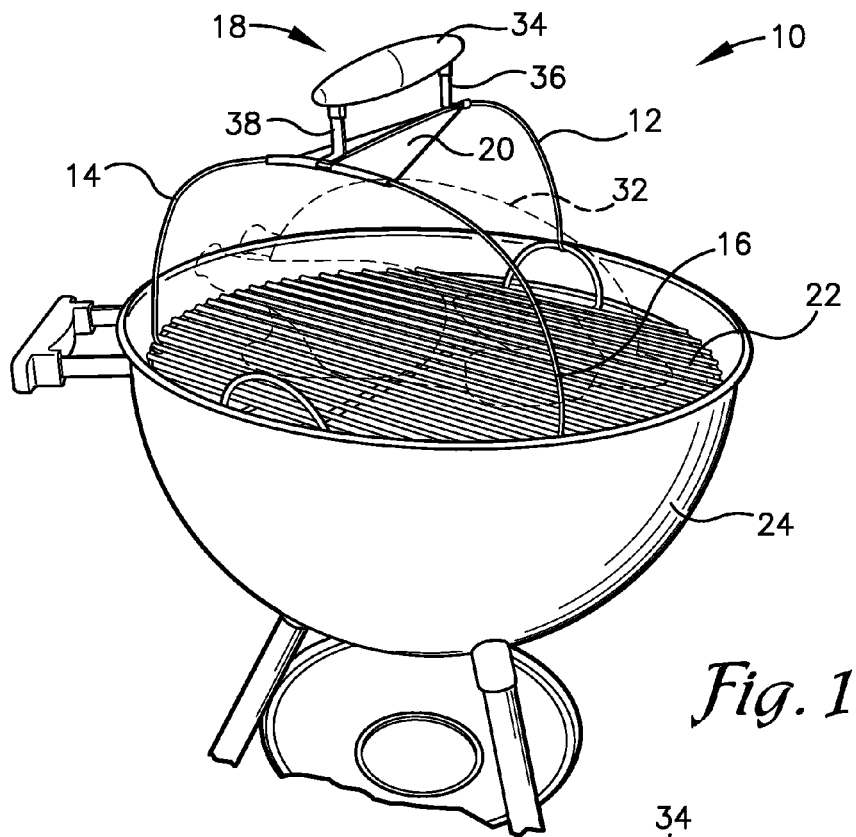
FIG. 1 is a perspective view of the grill grate lifter of the present invention engaged with a grill grate on a grill.
Figure 2:
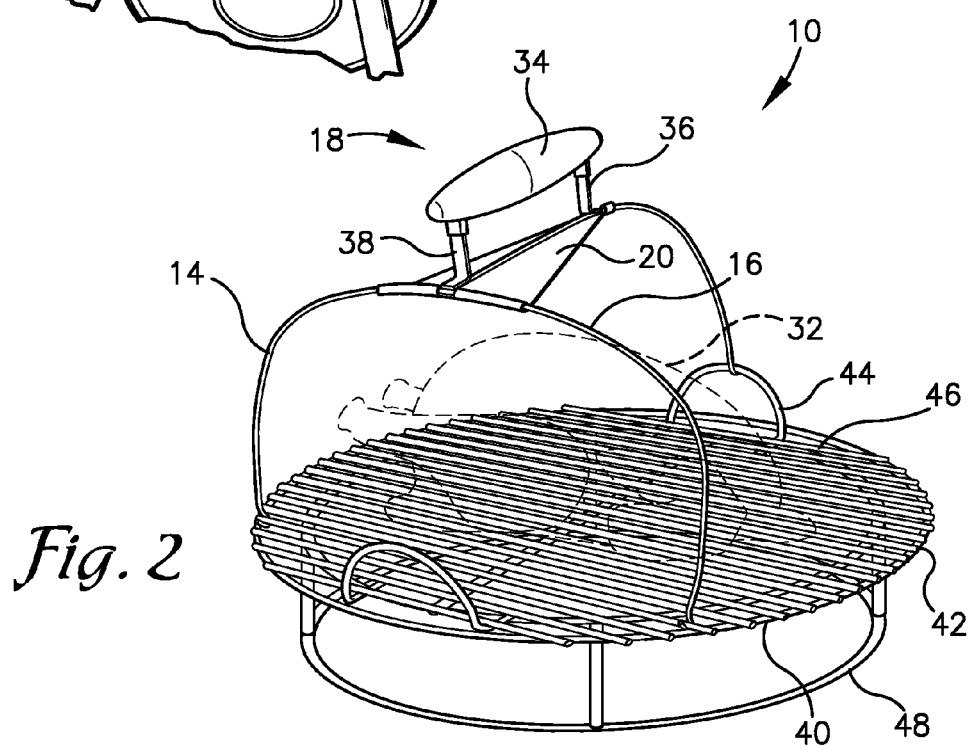
FIG. 2 is a perspective view of the grill grate lifter of the present invention engaged with a grill grate and sitting on a stand.
Figure 3:
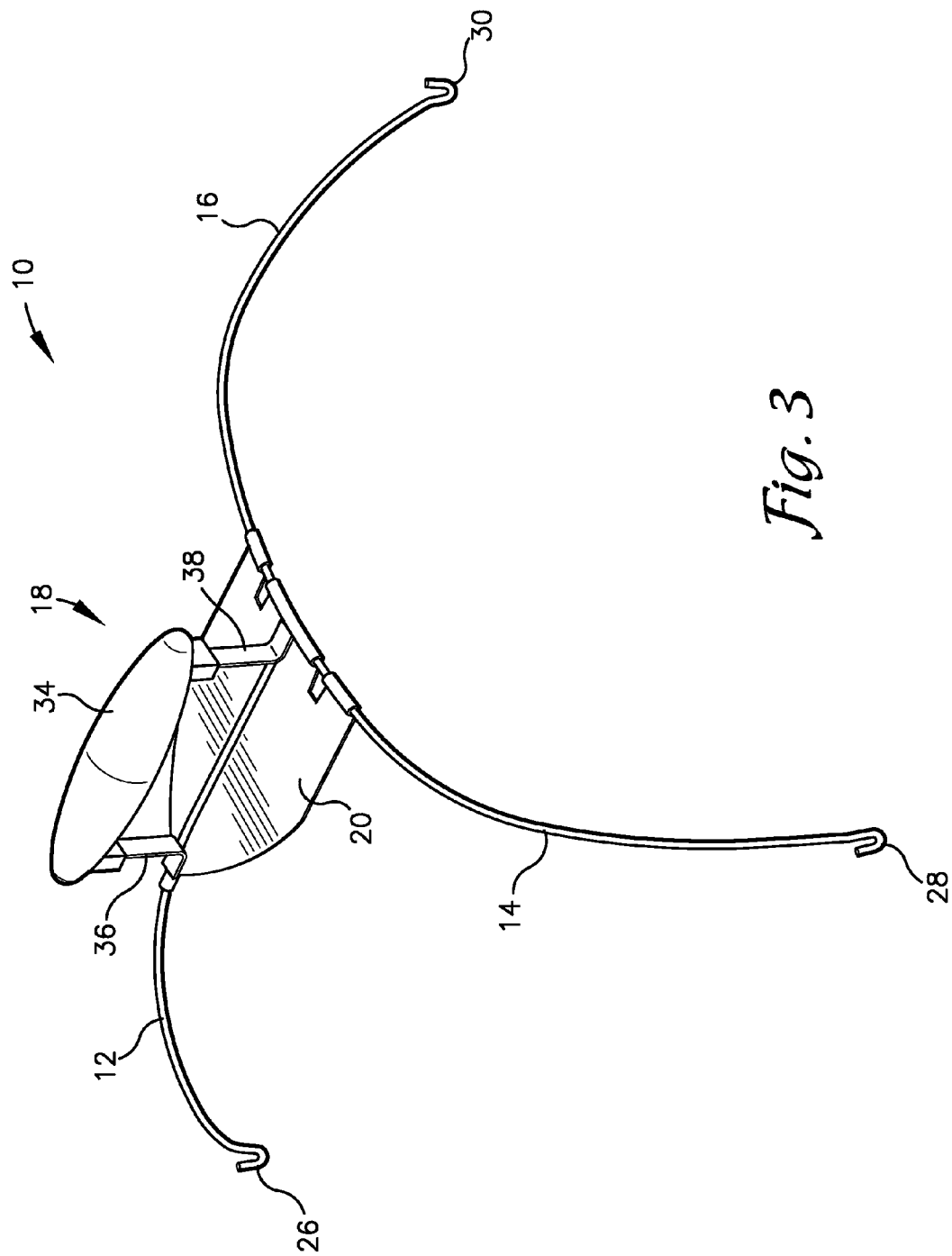
FIG. 3 is a perspective view of the grill grate lifter of the present invention.
Figure 4:
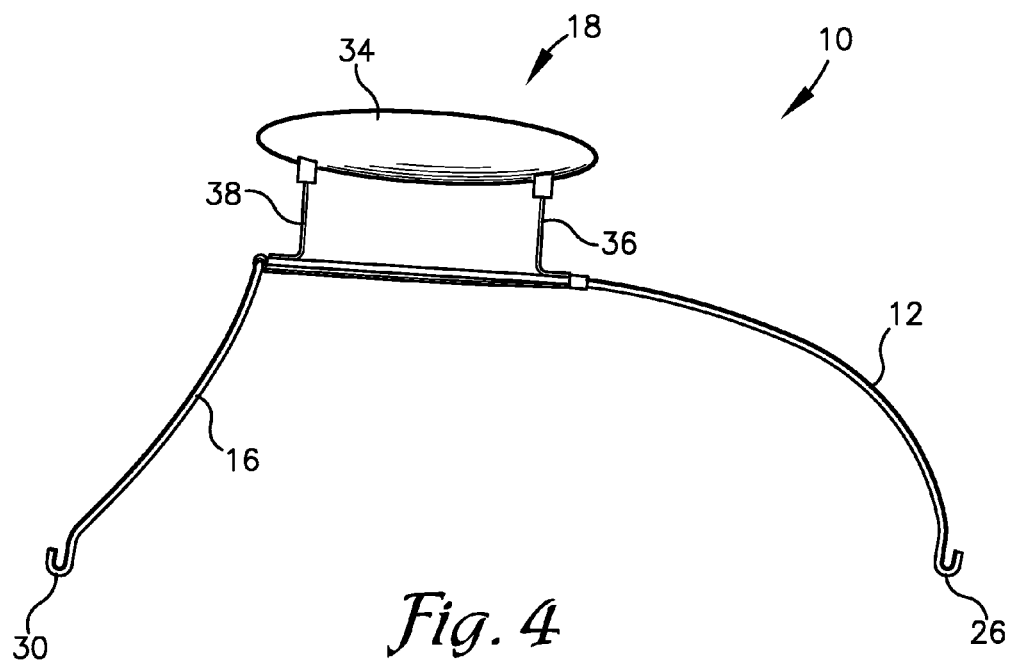
FIG. 4 is a side view of the grill grate lifter of FIG. 3.

Referring to FIGS. 1-4, an embodiment of a grill grate lifter is generally indicated by reference numeral 10. The grate lifter 10 includes three legs 12, 14 and 16, a handle 18 and a heat shield 20. As illustrated in FIG. 1, the grate lifter 10 is shown engaged with a grill grate 22 of a barbeque grill 24. The legs 12, 14 and 16 are joined together forming a body portion at the handle 18 and each terminates at a hooked end 26, 28 and 30, respectively. The legs 12, 14 and 16 have an arcuate shape to position the handle 18 (and a person's hand) well away from the hot charcoal or other heat source in the barbeque grill 24, and to provide space above a food item 32 cooking on the grate 22.

The legs 12, 14 and 16 may a rod made of a steel, aluminum, brass, copper or other appropriate material, bent to shape. The legs 14 and 16 may be made of a single rod cut to length and formed into an arc. The other leg 12 may then be welded to the mid-point of the arc to form a tripod. Legs 14 and 16 lie generally in a first plane and leg 12 lies in a second plane. The second plane is generally vertical and perpendicular to the first plane in a horizontal reference plane. The first plane is tilted at an angle from vertical with both legs 14 and 16 projecting away from leg 12.

The handle 18 includes a hand grip 34 and a pair of parallel legs 36 and 38, which are welded or otherwise coupled to the leg 12, with leg 38 secured at the intersection of leg 12 with legs 14 and 16 and leg 36 secured to leg 12 forward of the intersection point of the legs 12, 14 and 16. The hand grip 34 may be made of plastic, wood or other suitable material.

The hooks 28 and 30 clip into the grate 22 hooking a tine 40 at the peripheral or outside rim 42 of the grate 22 or onto the rim 42. The legs 14 and 16 are biased outwardly when engaged with the grate 22 so that they are pressed or biased against the outside rim 42 or into the intersection of the tine 40 and rim 42. The other leg 12 may be hooked on the handle portion 44 of the periphery of the grate or another tine 46, or rim 42 on the other side of the grate 22, particularly for grates 22 that may not have a handle 44. The three-point connection to the grate 22 generally forms an equilateral triangle. The handle 18 is positioned above the center of mass of the grate 22 and provides a stable and balanced platform for handling a hot grate 22, especially when loaded with food 32. When removed from the grill 24, the grate 22 may be placed on a stand 48 to support the grate 22 until it is replaced on the grill 24, or for serving the cooked food 32.

The heat shield 20 is secured to the legs 12, 14 and 16 below the handle 18 to protect a person's hand from the heat of the hot charcoal or other heat source in the barbeque grill 24.

Figure 5:
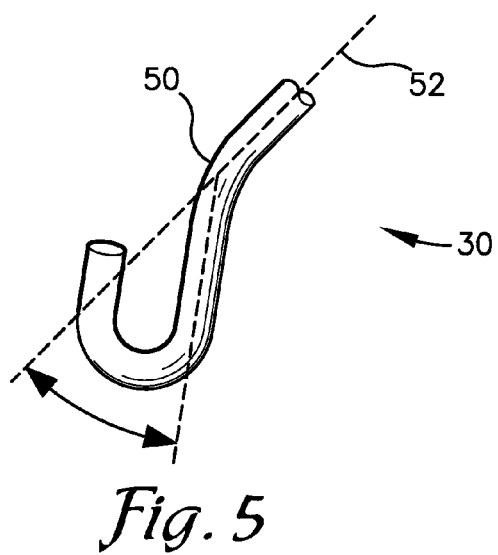
FIG. 5 is an enlarged view of one of the hooks of the grill grate lifter.

Referring to FIG. 5, at the end of each leg 12, 14 and 16 near the hooked end 26, 28 and 30, the leg may include a bend 50 of between 25 degrees and 45 degrees relative to a longitudinal axis 52 of the leg. The bend 50 allows for easier insertion and removal from the grate 22.

Figure 6:
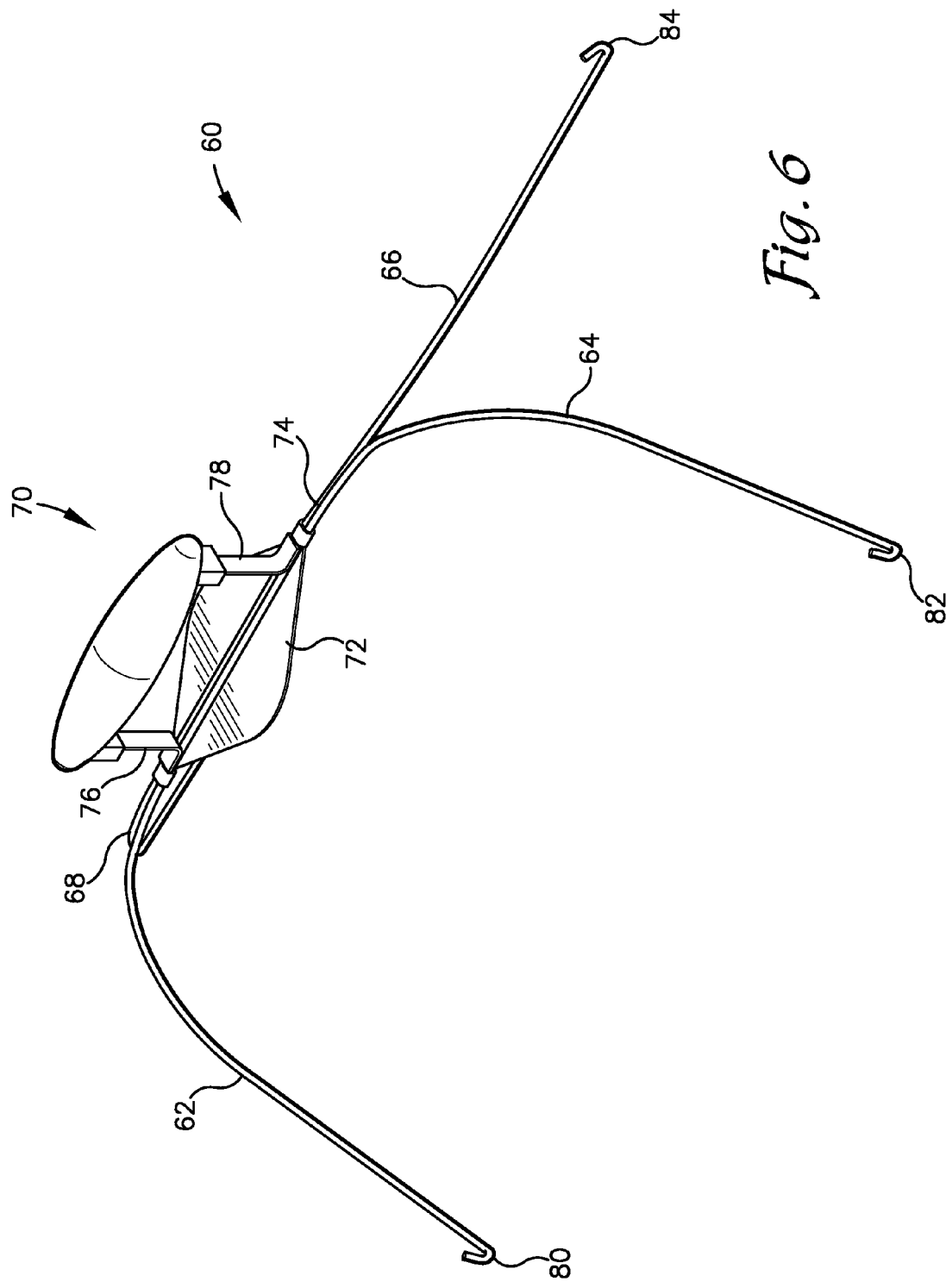
FIG. 6 is a perspective view of an alternate embodiment of a grill grate lifter of the present invention.

Referring to FIG. 6, an alternative embodiment of a grill grate lifter is generally indicated by reference numeral 60. Grill grate lifter 60 includes four legs 62, 64, 66 and 68, a handle 70 and a heat shield 72. Legs 62 and 64 are formed from a single length of rod bent into a C-shape. Likewise, legs 66 and 68 are also formed from a single length of rod bent into a C-shape. The C-shapes are welded together to form a spine 74. The legs 76 and 78 of the handle 70 are welded to the spine 74. Each of the legs 62, 64, 66 and 68 terminates in an end hook 80, 82 and 84, respectively (not shown for leg 68). The four-legged grill grate lifter 60 may be used for larger grill grates or to provide additional stability.

It is to be understood that while certain now preferred forms of this invention have been illustrated and described, it is not limited thereto except insofar as such limitations are included in the following claims.

Having thus described the invention, what is claimed as new and desired to be secured by Letters Patent is as follows:

1. A lifter for lifting a grate of a grill over a heat source, the grate having spaced tines and a periphery, the lifter comprising:
    a plurality of legs each having a first end and a free end extending outwardly and downwardly from said first end, said first ends secured together, each of said free ends terminating with a hook, and
    a handle having a first arm and a second arm, said first arm secured to said first ends of said plurality of legs and said second arm coupled to one of said plurality of legs at a location spaced apart from the first end thereof,
    wherein each of said hooks curves upwardly and outwardly from said respective leg,
    wherein each of said hooks is adapted to engage the grate at spaced apart points at the periphery of the grate.

2. The lifter of claim 1 wherein said plurality of legs includes three legs.

3. The lifter of claim 1 wherein each of said hooks includes a bend of between 25 and 45 degrees relative to a longitudinal axis of said respective leg.

4. The lifter of claim 1 wherein said handle is secured to said first ends of said plurality of legs above a center of mass of said lifter.

5. The lifter of claim 1 wherein each of said legs follows an arcuate path.

6. The lifter of claim 1 further comprising a heat shield secured to said first ends of said plurality of legs below said handle.

7. A lifter for lifting a grate of a grill over a heat source, the grate having spaced tines and a periphery, the lifter comprising:
    a body,
    a plurality of legs extending outwardly and downwardly from said body, each of said legs having a first end and a free end, said first ends secured together to form said body, each of said free ends terminating with a hook, each of said legs following an arcuate path, and
    a handle having a first arm and a second arm, said first arm secured to said body, said second arm secured to one of the plurality of legs along the length thereof,
    wherein each of said hooks curves upwardly and outwardly from said body,
    wherein each of said legs is biased outwardly toward the periphery of the grate and each of said hooks is adapted to engage the grate at spaced apart points at the periphery of the grate.

8. The lifter of claim 7 wherein said plurality of legs includes three legs.

9. The lifter of claim 7 wherein each of said hooks includes a bend distinct from said hook of between 25 and 45 degrees relative to a longitudinal axis of said respective leg.

10. The lifter of claim 7 wherein said handle is secured to said body above a center of mass of said lifter.

11. The lifter of claim 7 further comprising a heat shield secured to said body below said handle.

* * * * *